United States Patent Office 2,694,733
Patented Nov. 16, 1954

2,694,733

PROCESS FOR MAKING BETA-ALIPHATICOXY-PROPIONALDEHYDE

Lucian W. McTeer, South Charleston, and Thomas R. Miller and Helmut W. Schulz, Charleston, W. Va., assignors to Union Carbide and Carbon Corporation, a corporation of New York No Drawing. Original application July 6, 1950, Serial No. 172,382. Divided and this application May 26, 1954, Serial No. 432,586

3 Claims. (Cl. 260—602)

This application relates to the manufacture of beta-aliphaticoxypropionaldehydes. More particularly it is concerned with an improvement in processes for making them by reaction of a primary aliphatic alcohol with acrolein, as illustrated, in the case of methanol by the following equation:

$$CH_3OH + CH_2=CHCHO \rightarrow CH_3OCH_2CH_2CHO$$

Heretofore beta-alkoxypropionaldehydes have not been attainable in good yields and efficiencies. As is well known in the art, when alcohols are reacted with acrolein in the presence of mineral acid catalysts, three molecules of the alcohol react with one molecule of acrolein to form the corresponding beta-alkoxydialkyl acetal. The use of alkaline catalysts, on the other hand, leads to extensive and sometimes violent condensation and resinification. Thus, because of either or both of these wasteful reactions the commercial production of beta-alkoxypronionaldehyde from acrolein and alcohol has not been feasible. In the absence of catalyst the reaction of acrolein with alcohols proceeds extremely slowly as is also known.

The present improvement is based upon our discovery that when the reaction is carried out in a neutral reaction mixture in the presence of a catalyst which is an amine compound, including amines in the form of their salts, which give to an acrolein-alcohol mixture a neutral reaction, the alcohol reacts with acrolein at the ethylenic bond to form, in the case of the alkanols, a beta-alkoxypropionaldehyde, to the virtual exclusion of acetalization and aldol condensation. By the term "neutral" as used herein is meant an alcohol-acrolein reaction medium having a pH of about 5.9 to 7.5. Preferably, however, the reaction medium is maintained at a pH just below 7.0. In using the amine catalyst, which normally has a pH slightly above 7.0, this control of the hydrogen ion concentration is accomplished by adding to the reaction mixture a suitable amount of a carboxylic acid to bring the pH within the specified range. For this purpose a wide variety of carboxylic acids are suitable, of which the following are representative: formic, acetic, propionic, butyric, valeric, hexanoic, heptanoic, octanoic, oxalic, succinic, benzoic and the like. As will be evident from well-established principles, the quantity of acid required for control of the hydrogen ion concentration within the specified limits will be at least that required to react with all the amine plus an amount in excess thereof sufficient to keep the pH of the reaction mixture below 7.0. As will also be evident from well-established principles the amount of acid to be employed over and above that required for reaction with the amine will vary from acid to acid and amine to amine, dependent upon the dissociation constants of the compounds involved. Thus, in the case of a very weak amine and a strong carboxylic acid a slight amount of the acid over the stoichiometric equivalent would be sufficient. Conversely, with a strong amine base and a weak acid, stoichiometric equivalents of acid to amine as high as 3 to 1 may be indicated. In the case of the amphoteric amine compounds, the use of the carboxylic acid can be dispensed with, but it is not necessary to do so provided the quantity used is insufficient to take the pH of the reaction outside the specified range. In some instances the use of a small quantity of carboxylic acid with the amphoteric amine compound also may be found advantageous.

Based on studies in which a large number and variety of amines were used, it appears that hardly any amine is without catalytic activity to some extent. There can be used, for instance, primary, secondary and tertiary amines, polyamines, and the like, including amphoteric amine compounds. These amines can be aliphatic or aromatic or mixed aliphatic and aromatic, including carbocyclic and heterocyclic. By the term "amphoteric amine compound" as used herein is meant an amine of the classes listed above which also contains in the molecule an acidic hydrogen atom connected to a carbon atom through an oxygen atom, as in the case of the aminoacids and aminophenols by way of illustration. Representative of the useful amines are the following: monomethylamine, dimethylamine, trimethylamine, monoethylamine, diethylamine, triethylamine, monopropylamine, dipropylamine, tripropylamine, monobutylamine, dibutylamine, tributylamine, and mono-, di-, and tri-alkyl amines containing up to seven carbon atoms to the alkyl group; aniline, diphenylamine, orthotoluidine, acetanilide, monomethylaniline, dimethylaniline and other arylamines and alkyl-substituted arylamines containing up to seven carbon atoms to the group attached to the nitrogen atom; monoethanolamine, diethanolamine, triethanolamine, monopropanolamines, dipropanolamines, tripropanolamines, the butanol amines, the pentanol amines, the hexanol amines, the heptanolamines, and the nitrogen-alkyl substitution products of the mono- and dialkylolamines up to and including seven carbon atoms to the nitrogen-alkyl group thereof; diethylene triamine, triethylene tetramine, orthophenylenediamine, and other aliphatic and aromatic polyamines containing not more than seven carbon atoms to the aliphatic or aromatic group present therein. Representative of the amphoteric amine compounds that can be used as catalyst in our process are glycine, beta-alanine, anthranilic acid, aminophenols and the like.

The reaction conditions in other respects are not critical. The reaction can be carried out merely by heating the reaction mixture to a suitable reaction temperature. For instance, the reaction can be carried out advantageously by heating the reaction mixture at its boiling temperature under reflux at atmospheric pressure. Higher temperatures can be employed, if desired, by heating under superatmospheric pressure, with shorter reaction periods as compared with atmospheric operation. The preferred temperatures are from 50° C. to 100° C., although higher and lower temperatures can also be employed as indicated.

Preferably, also, the reaction is carried out with an amount of alcohol in the reaction mixture which is more than is required by theory to convert all of the acrolein to the beta-alkoxypropionaldehyde. The preferred ratio is within the range of from three to seven mols of the alcohol per mol of acrolein. The reaction can also be carried out, however, at ratios outside this range.

Similarly, the catalyst concentration is not narrowly critical but may be varied within wide limits. A catalyst concentration of the order of 0.05 to 1 per cent by weight is preferred. Within this range the exact amount which is employed depends to some extent upon the particular catalyst selected. Larger or smaller concentrations can also be used but ordinarily no commensurate advantage results from the use of concentrations in excess of one per cent. On the other hand, at concentrations below 0.05 per cent, a longer reaction time is usually required.

Polymerization inhibitors can also be used without adverse effect on the reaction, as for instance, hydroquinone.

Upon completion of the reaction, it will usually be found desirable to separate the product and unreacted starting materials from the catalyst and residues at temperatures and pressures which are sufficiently low and a contact time which is sufficiently short to prevent reversion of the addition reaction. Otherwise reversion could occur and seriously impair the yield and the efficiencies, as will be understood in accord with well-known principles of chemical action. In large scale operation especially, it is important to avoid lengthy distillation times and high kettle temperatures in the refining step. Preferably, a rapid separation of the catalyst and heavy ends from the balance of the reaction mixture is first effected by some suitable means, such as a falling film evaporator, which is known.

For the purpose of convenient illustration in describing the improvement, reference has been had above to the alkanols as starting materials, of which the lower alkanols constitute our preferred embodiment. The improvement is susceptible of broader applicability, however, to primary aliphatic alcohols, saturated and unsaturated, composed of carbon, hydrogen and oxygen and free of groups reactive with acrolein, other than hydroxyl, of which the following are representative: methyl, ethyl, propyl, butyl, pentyl, hexyl and octyl alcohols, allyl alcohol, methoxyethanol, ethoxyethanol, methoxypropanol, ethoxypropanol, cyclohexanol, ethylene glycol, diethylene glycol, propylene glycol, and the like. The improvement is particularly useful in the case of alcohols having up to eight carbon atoms to the molecule, which are preferred. By the term "lower" alcohol and "lower" alkanol as used herein is meant alcohols having not more than eight carbon atoms to the molecule.

The improvement is applicable also to methacrolein,

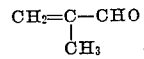

as a starting material in place of acrolein and to the preparation of the corresponding aliphatic oxy derivatives of the general formula

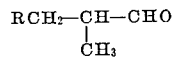

where R is an oxyaliphatic group composed of carbon, hydrogen and oxygen corresponding to the aliphatic alcohols described above.

The improvement is further illustrated by the following examples:

*Example 1*

A mixture of ethanol and acrolein in the mol ratio of four mols of ethanol per mol of acrolein was heated at its boiling temperature under a reflux condenser in the presence of a diethylamine-formic acid mixture. The mol ratio of formic acid to diethylamine was 1.75 to 1, giving a pH of 6.5 in the reaction mixture. The diethylamine-formic acid concentration was 0.45 per cent.

The reaction mixture was heated for 13.5 hours and the reaction temperature under reflux was 61° C. to 71° C. The conversion was 61.2 per cent with an efficiency to distilled beta-ethoxypropionaldehyde of 86.4 per cent.

*Example 2*

A run similar to that of Example 1 was made, using a mixture of triethylamine and formic acid. The mol ratio of ethanol to acrolein was 4.06 to 1 and the concentration of the triethylamine and formic acid was 0.53 per cent by weight. The mol ratio of formic acid to amine was 1.75 to 1, which produced a pH of 6.4 in the reaction mixture. Heating at the refluxing temperature was carried out for a period of thirty-one hours.

At the end of the heating period the reaction mixture was processed in a continuous stripping still under a pressure of 120 millimeters of mercury absolute. The still was packed with stainless steel sponge and had a fractionating capacity equivalent to twenty theoretical plates. Fractionation of the overhead product in a second continuous still resulted in a kettle product containing 94 per cent of beta-ethoxypropionaldehyde. This mode of processing illustrates that a virtually quantitative recovery of the reaction product is obtainable. A conversion of 61.5 per cent was obtained with an efficiency to distilled beta-ethoxypropionaldehyde of 94.6 per cent.

*Example 3*

A run was made using methanol and acrolein in a mol ratio of 4 to 1, using a triethylamine-formic acid mixture in a concentration of 0.47 per cent. The mol ratio of formic acid to triethylamine was 1.25 to 1, giving a pH of 6.6 in the reaction mixture.

Heating was carried out under pressure at a temperature of about 90° C. for a period of three hours. A conversion of 64.4 per cent was obtained with an efficiency to distilled beta-methoxypropionaldehyde of 82.6 per cent.

*Example 4*

A run was made similar to that of Example 3 with a mol ratio of methanol to acrolein of 4 to 1 in the presence of diethylamine and propionic acid in 0.85 per cent concentration. The mol ratio of propionic acid to diethylamine was 2.4 to 1 and the pH of the reaction mixture was 7.3.

The reaction mixture was heated at its refluxing temperature, about 58° C. to 65° C., for a period of 4.5 hours. A conversion of 67.7 per cent was obtained with an efficiency to distilled beta-methoxypropionaldehyde of 82.6 per cent.

*Example 5*

A mixture of ethanol and acrolein in a mol ratio of 4 to 1 was heated at its refluxing temperature of about 62° C. to 75° C. for a period of eight hours in the presence of diethylemetriamine and succinic acid. The mixture of the diethylemetriamine and the succinic acid was in the mol ratio of acid to amine of 3 to 2. The concentration of the amine-acid mixture was 0.5 per cent.

The pH of the reaction mixture at the start was 6.84 and rose to 6.95 over the eight-hour reaction period. A conversion of 63.1 per cent was obtained with an efficiency to distilled beta-ethoxypropionaldehyde of 62.1 per cent.

*Example 6*

A mixture of methanol and acrolein in a mol ratio of 6 to 1 was refluxed for a period of nineteen hours in the presence of glycine in a concentration of 0.1 per cent by weight. The pH of the reaction mixture was 5.9 to 7.2 and the refluxing temperature was 58° C. to 63° C.

The run afforded a conversion of 65.0 per cent and an 86.7 per cent efficiency to beta-methoxypropionaldehyde. Seventy-five per cent of the total beta-methoxypropionaldehyde recovered was obtained as a distillation fraction of 98.0 per cent purity.

*Example 7*

A mixture of methanol and acrolein in a mol ratio of 6 to 1 was heated under pressure at a temperature of about 90° C. for a period of two hours. The catalyst employed was para-aminophenol in a concentration of 0.25 per cent by weight. The pH of the reaction mixture was 7.0.

The run afforded a conversion of 62.5 per cent with an efficiency to 3-methoxypropionaldehyde of 77.2 per cent.

*Example 8*

A mixture of butanol and acrolein in the mol ratio of 4 to 1 was heated for a period of 45 minutes at its refluxing temperature of 80° C. to 107° C. in the presence of a mixture of formic acid and diethylamine in a mol ratio of 1.5 to 1. The concentration of the formic acid and diethylamine was 0.42 per cent by weight. The pH of the reaction mixture was 6.7. Beta-butoxypropionaldehyde was recovered from the reaction mixture by vacuum distillation. It boiled at 35° C. at a pressure of two millimeters of mercury, absolute, and had a density of 0.892 at 30°/20° C. The conversion was 74.0 per cent with an efficiency to distilled beta-butoxypropionaldehyde of 54.9 per cent.

*Example 9*

A mixture of allyl alcohol and acrolein in a mol ratio of 4 to 1 was heated at its refluxing temperature of about 80° C. to 90° C. for a period of 4.5 hours in the presence of 0.42 per cent by weight of a mixture of formic acid and diethylamine. The formic acid and diethylamine were in the mol ratio of 1.5 to 1. The pH of the reaction mixture was 5.9. The conversion was 55.1 per cent with an efficiency to distilled beta-alloxypropionaldehyde of 83.2 per cent. The beta-alloxypropionaldehyde boiled at a temperature of about 42° C. at a pressure of about two millimeters of mercury absolute. It had a density of 0.935 at 30°/20° C.

*Example 10*

A mixture of ethanol and acrolein in the mol ratio of 4 to 1 was heated at a temperature of 90° C. for 8 hours in the presence of 0.44 per cent of a mixture of formic acid and triethanolamine in the mol ratio of 1.5 to 1. The pH of the reaction mixture was 6.3. A conversion of 56.8 per cent was obtained with an efficiency to beta-ethoxypropionaldehyde of 67.9 per cent.

*Example 11*

A mixture of ethanol and acrolein in the mol ratio of 4 to 1 was heated under pressure to a temperature of about 85° C. for a period of 7 hours in the presence of 0.53 per cent by weight of acetic acid and para-aminophenol in the mol ratio of 3 to 1.

The pH of the reaction mixture at the start was 6.7 and rose to 6.9 over the 7 hour reaction period. A conversion of 48.7 per cent was obtained with an efficiency to beta-ethoxypropionaldehyde of 85.6 per cent.

*Example 12*

A mixture of ethanol and acrolein in the mol ratio of 4 to 1 was heated under pressure to a temperature of about 85° C. for a period of 7 hours in the presence of 1.0 per cent by weight of acetic acid and aniline in the mol ratio of 3 to 1.

The pH of the reaction mixture at the start was 6.6 and rose to 6.7 over the 7 hour reaction period. A conversion of 59.4 per cent was obtained with an efficiency to beta-ethoxypropionaldehyde of 82.8 per cent.

This application is a division of copending application Serial No. 172,382, filed July 6, 1950.

What is claimed is:

1. In a process for the production of a beta-aliphatic-oxypropionaldehyde composed of carbon, hydrogen and oxygen wherein acrolein and an aliphatic alcohol composed of carbon, hydrogen and oxygen and free of reactive groups other than hydroxyl are caused to react by heating in the liquid phase, the improvement which comprises catalyzing the reaction by the addition to the reaction mixture of a small amount of an alcohol amine and controlling and maintaining the hydrogen ion concentration of the reaction mixture of acrolein and alcohol at a pH of 5.9 to 7.5 by the addition of a carboxylic acid in sufficient amount to maintain the hydrogen ion concentration at the specified value.

2. The process of claim 1 further characterized in that the alcohol amine is an ethanol amine.

3. The process of claim 1 further characterized in that the alcohol amine is triethanolamine.

No references cited.